US 8,271,871 B2

United States Patent
Marchesotti

(10) Patent No.: US 8,271,871 B2
(45) Date of Patent: Sep. 18, 2012

(54) AUTOMATED METHOD FOR ALIGNMENT OF DOCUMENT OBJECTS

(75) Inventor: Luca Marchesotti, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 498 days.

(21) Appl. No.: 12/432,948

(22) Filed: Apr. 30, 2009

(65) Prior Publication Data

US 2010/0281361 A1 Nov. 4, 2010

(51) Int. Cl.
*G06F 17/00* (2006.01)
(52) U.S. Cl. ........ 715/243; 715/253; 715/235; 715/256; 715/857; 345/418; 382/298
(58) Field of Classification Search .................. 715/243, 715/256, 235, 857, 253; 345/418; 382/298
See application file for complete search history.

(56) References Cited

U.S. PATENT DOCUMENTS

| | | | | |
|---|---|---|---|---|
| 5,424,945 A * | 6/1995 | Bell | ................ | 705/1.1 |
| 5,463,722 A * | 10/1995 | Venolia | ................ | 345/662 |
| 5,649,032 A * | 7/1997 | Burt et al. | ................ | 382/284 |
| 6,421,463 B1 * | 7/2002 | Poggio et al. | ................ | 382/224 |
| 6,686,935 B1 * | 2/2004 | Richard | ................ | 715/765 |
| 6,829,382 B2 * | 12/2004 | Lee et al. | ................ | 382/151 |
| 6,973,213 B2 * | 12/2005 | Fan et al. | ................ | 382/176 |
| 6,983,068 B2 * | 1/2006 | Prabhakar et al. | ................ | 382/162 |
| 7,019,773 B1 * | 3/2006 | Heath | ................ | 348/218.1 |
| 7,024,022 B2 | 4/2006 | Harrington et al. | | |
| 7,035,438 B2 | 4/2006 | Harrington et al. | | |
| 7,095,879 B2 * | 8/2006 | Yan et al. | ................ | 382/118 |
| 7,243,303 B2 | 7/2007 | Purvis et al. | | |
| 7,260,245 B2 | 8/2007 | Harrington et al. | | |
| 7,360,157 B1 * | 4/2008 | Yalovsky | ................ | 715/256 |
| 7,391,885 B2 | 6/2008 | Harrington et al. | | |
| 7,400,761 B2 | 7/2008 | Ma et al. | | |
| 7,583,857 B2 * | 9/2009 | Xu et al. | ................ | 382/294 |
| 7,660,441 B2 * | 2/2010 | Chen et al. | ................ | 382/113 |
| 7,751,627 B2 * | 7/2010 | Widdowson et al. | ................ | 382/215 |
| 7,788,579 B2 * | 8/2010 | Berkner et al. | ................ | 715/243 |
| 7,869,667 B1 * | 1/2011 | Wu | ................ | 382/307 |
| 7,894,666 B2 * | 2/2011 | Mitarai et al. | ................ | 382/167 |
| 2003/0215775 A1 | 11/2003 | Bizziocchi | | |
| 2005/0028097 A1 | 2/2005 | Harrington et al. | | |
| 2005/0063667 A1 * | 3/2005 | Herley | ................ | 386/46 |
| 2005/0157926 A1 | 7/2005 | Moravec | | |
| 2006/0093184 A1 | 5/2006 | Fukui et al. | | |
| 2006/0248071 A1 | 11/2006 | Campbell et al. | | |

(Continued)

OTHER PUBLICATIONS

Hou, Xiaodi et al., Saliency Detection: A Spectral Residual Approach, Jun. 2007, IEEE.*

(Continued)

*Primary Examiner* — Adam M Queler
*Assistant Examiner* — Aaron Johnson
(74) *Attorney, Agent, or Firm* — Fay Sharpe LLP

(57) ABSTRACT

An apparatus and automated method are disclosed for alignment of objects in a document which allows saliency within one or both objects to be a factor in the alignment. The method includes, for an input electronic document, identifying first and second objects to be aligned on a page of the document. A one dimensional guideline profile is generated for at least the first object based on a detection of saliency for the first object. The first and second objects are aligned based on the guideline profile to form a modified document and the modified document is output.

20 Claims, 9 Drawing Sheets

U.S. PATENT DOCUMENTS

| | | | | |
|---|---|---|---|---|
| 2006/0253777 | A1* | 11/2006 | Yalovsky | 715/530 |
| 2007/0005356 | A1 | 1/2007 | Perronnin | |
| 2007/0180363 | A1 | 8/2007 | Dance | |
| 2007/0229492 | A1* | 10/2007 | Higuchi | 345/418 |
| 2007/0229693 | A1* | 10/2007 | Kameyama et al. | 348/333.01 |
| 2007/0258648 | A1 | 11/2007 | Perronnin | |
| 2008/0025639 | A1* | 1/2008 | Widdowson et al. | 382/284 |
| 2008/0063298 | A1* | 3/2008 | Zhou et al. | 382/280 |
| 2008/0069456 | A1 | 3/2008 | Perronnin | |
| 2008/0075361 | A1* | 3/2008 | Winn et al. | 382/155 |
| 2008/0247611 | A1* | 10/2008 | Aisaka et al. | 382/118 |
| 2008/0247612 | A1* | 10/2008 | Reber | 382/118 |
| 2008/0304708 | A1 | 12/2008 | Le Meur et al. | |
| 2008/0304740 | A1 | 12/2008 | Sun et al. | |
| 2008/0304742 | A1 | 12/2008 | Connell | |
| 2009/0034849 | A1* | 2/2009 | Grosvenor | 382/199 |
| 2009/0034859 | A1 | 2/2009 | Grosvenor | |
| 2010/0226564 | A1* | 9/2010 | Marchesotti et al. | 382/159 |
| 2010/0281361 | A1* | 11/2010 | Marchesotti | 715/253 |

OTHER PUBLICATIONS

Hou et al., Saliency Detection: A Spectral Residual Appraoch, Jun. 2007, IEEE Conf. on Computer Vision and Pattern Recognition.*

U.S. Appl. No. 12/400,277, filed Mar. 9, 2009, Marchesotti, et al.

U.S. Appl. No. 12/250,248, filed Oct. 13, 2008, Marchesotti, et al.

U.S. Appl. No. 12/033,434, filed Feb. 19, 2008, Csurka.

Csurka, et al., Visual Categorization with Bags of Keypoints, in *ECCV Workshop on Statistical Learning for Computer Vision*, 2004.

Feng, et al., Multi-Cues Eye Detection on Gray Intensity Image, *Pattern Recognition*, 34(5), 1033-1046, Elsevier, 2001.

Gao, et al., Bottom-Up Saliency is a Discriminant Process, *Proc. of IEEE Intl. Conf. on Computer Vision (ICCV)*, Rio de Janeiro, Brazil (2007).

Gao, et al., The Discriminant Center-Surround Hypothesis for Bottom-Up Saliency, *Proc. of Neural Information Processing Systems (NIPS)*, Vancouver, Canada (2007).

Hou, et al., Saliency Detection: A Spectral Residual Approach, *IEEE Conf. on Computer Vision & Pattern Recognition* (2007).

Huang, et al., A MPEG-7 Based Content-Aware Album System for Consumer Photographs, *Bulletin of the College of Engineering*, NTU, no. 90, pp. 3-24, Feb. 2004, available at www.cmlab.csie.ntu.edu.tw/~chenhsiu/research/cm_ncs2003.pdf.

Itti, et al., A Model of Saliency-Based Visual Attention for Rapid Scene Analysis, *IEEE Transactions on Pattern Analysis and Machine Intelligence*, 20(11):1254-1259 (1998).

Itti, et al., A Saliency-Based Search Mechanism for Overt and Covert Shifts of Visual Attention, *Vision Research*, vol. 40, pp. 1489-1506 (2000).

Itti, et al., Computational Modeling of Visual Attention, *Nature Reviews Neuroscience*, 2(3): 194-203, 2001.

Jones, et al., Statistical Color Models with Application to Skin Detection, *IJCV* (46), No. 1, Jan. 2002, pp. 81-96.

Lin, Active Document Layout Synthesis, $8^{th}$ *Intl. Conf. on Document Analysis and Recognition*, 2005, Seoul, Korea.

Lin, Intelligent Content Fitting for Digital Publishing, *SPIE Conf. on Digital Publishing*, San Jose, CA, USA, Jan. 15-19, 2006.

Liu, et al., Learning to Detect a Salient Object, *CVPR*, 2007.

Nagy, Twenty Years of Document Image Analysis in PAMI, *IEEE Transactions on Pattern Analysis and Machine Intelligence*, vol. 22, No. 1, Jan. 2000.

Viola, et al., Robust Real-Time Face Detection, *Intl. Journal of Computer Vision (IJCV)*, 57(2) 137-154 (2004)

Wang, et al., A Two-Stage Approach to Saliency Detection in Images, *IEEE Intl. Conf. on Acoustics, Speech, and Signal Processing (ICASSP)*, Mar./Apr. 2008.

Wong, et al., Document Analysis System, *IBM J. Res. Develop*, vol. 26, No. 6, Nov. 1982.

* cited by examiner

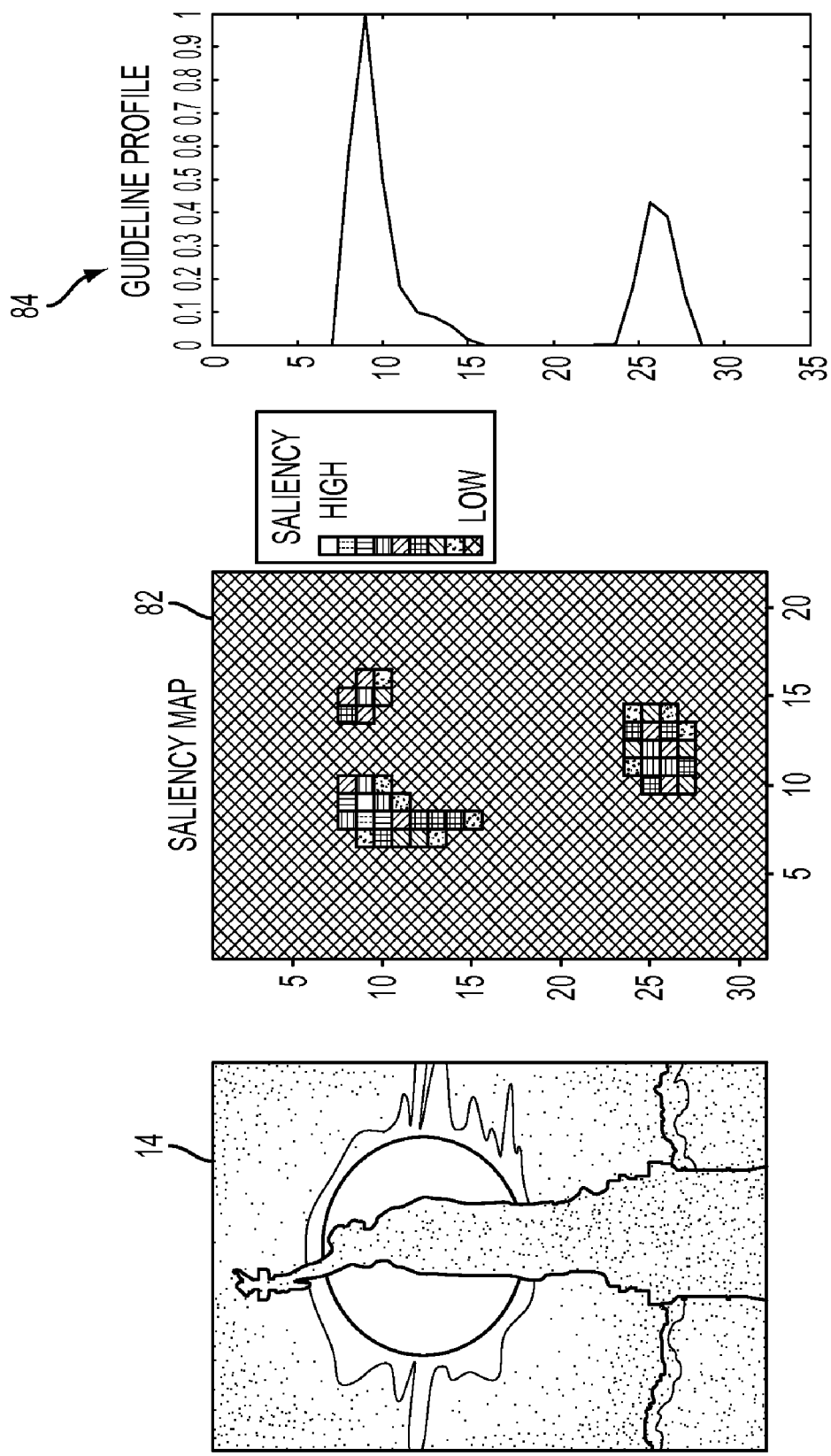

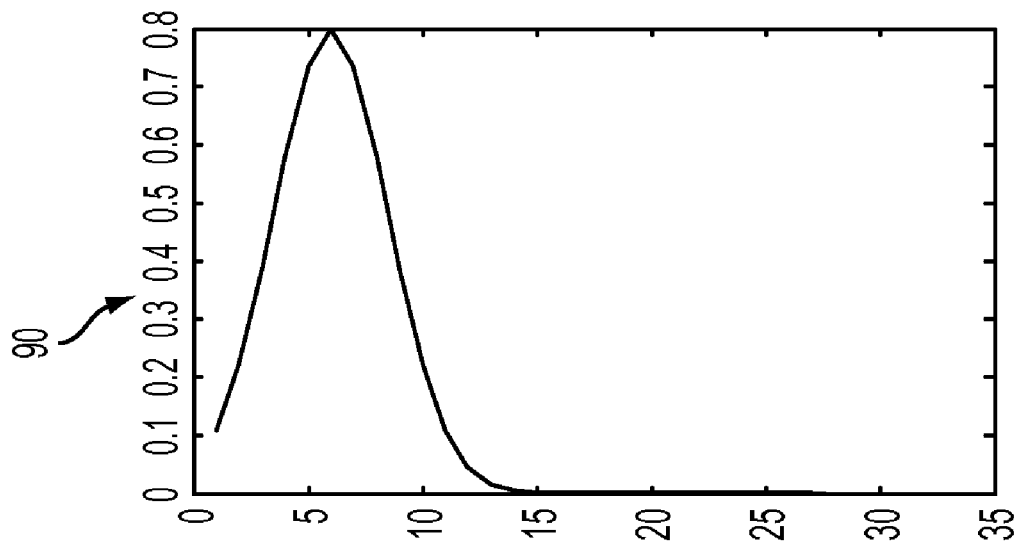
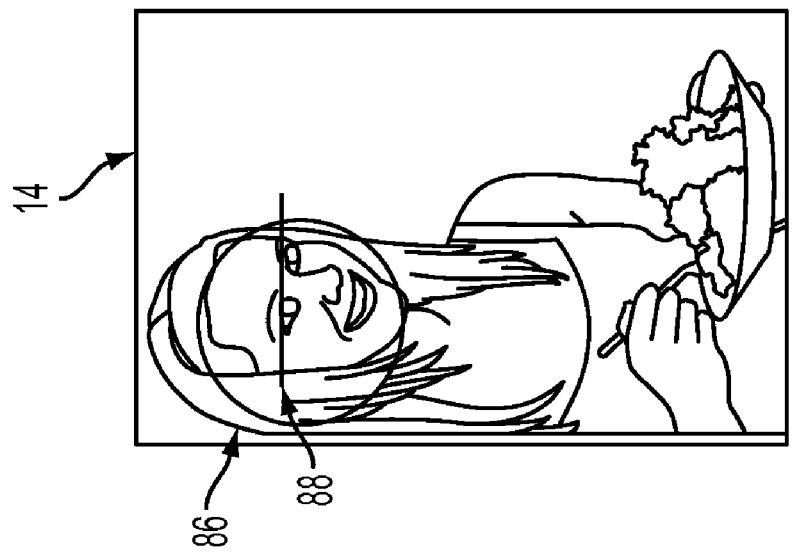
FIG. 8

AUTOMATED METHOD FOR ALIGNMENT OF DOCUMENT OBJECTS

CROSS REFERENCE TO RELATED PATENTS AND APPLICATIONS

The following copending applications, the disclosures of which are incorporated herein in their entireties by reference, are mentioned:

U.S. patent application Ser. No. 12/400,277, filed Mar. 9, 2009, entitled A FRAMEWORK FOR IMAGE THUMBNAILING BASED ON VISUAL SIMILARITY, by Luca Marchesotti, et al.

U.S. patent application Ser. No. 12/250,248, filed Oct. 13, 2008, entitled IMAGE SUMMARIZATION BY A LEARNING APPROACH, by Luca Marchesotti, et al.

U.S. application Ser. No. 12/033,434, filed Feb. 19, 2008, entitled CONTEXT DEPENDENT INTELLIGENT THUMBNAIL IMAGES, by Gabriela Csurka.

BACKGROUND

The exemplary embodiment relates to document layout. It finds particular application in connection with an automated system and method for aligning objects of a document which takes into account saliency within the object.

Content alignment consists of the organization of the various objects (textual, graphical, and pictorial images) composing a digital document. The purpose of this operation is generally to promote readability and usability of the document by organizing the document object inside a page, so that their content is aligned with the natural eye's scanning patterns.

Graphical designers use intuition and experience in determining where to position text objects and pictorial objects in a document to provide an arrangement which is pleasing to the observer. Where text relates to a pictorial object, the text may be positioned to the left or right of the object, between upper and lower horizontal guidelines corresponding to the top and bottom of the pictorial object. The graphical designer may align the text with a human face, or in the case of an enlarged portrait, the professional designer may align the textual object with the eyes or line of sight of the eyes in the face.

For many applications, such as variable data applications, where either the text or the image may vary in the document, depending on the recipient, such a manually intensive approach may not be cost effective. Automated methods of alignment are available, however, these methods simply center the text between the horizontal guidelines or align it with upper or lower guidelines. Such approaches lack flexibility and can often lead to results which are not aesthetically pleasing to the observer. Object alignment thus remains an operation which is usually performed manually during the document editing.

There remains a need for automated content-based alignment methods which may be utilized in applications such as digital publishing where overall aesthetic quality is highly valued.

INCORPORATION BY REFERENCE

The following references, the disclosures of which are incorporated herein in their entireties by reference, are mentioned:

U.S. Pub. No. 2009/0034849, published Feb. 5, 2009, entitled IMAGE PROCESSING METHOD, IMAGE PROCESSING SYSTEM AND COMPUTER PROGRAM PRODUCT, by Grosvenor, discloses an image processing method for cropping first and second images for presentation in a template. The first image has a first feature and the second image has a second feature. The template has first and second image boundary shapes. The method includes determining the locations of the first and second features in the respective images and calculating a constraint on the locations of the first image boundary shape on the first image and the second image boundary shape on the second image. The constraint is based on an alignment criterion specifying the alignment of the first feature in the first image and the second feature in the second image when the first and second images are presented in the template and generating a cropped image combination by placing the first image boundary shape on the first image and the second image boundary shape on the second image according to the constraint.

U.S. Pat. No. 7,360,157, issued Apr. 15, 2008, entitled ALIGNING CONTENT IN AN ELECTRONIC DOCUMENT, by Yalovsky discloses aligning the contents of document objects on an electronic document page. Organizing a page of document objects so textual content is aligned to natural eye scanning patterns promotes readership and usability. When a user creates a new island of text, the new text can be snapped into alignment with an existing island of text. Invisible guidelines that emanate from textual features in a document object can provide a relative alignment reference that floats with the position of the object on the page. In response to placing a content insertion point ("IP") on an electronic page with an existing document object, the IP can be automatically aligned to the content of the existing document object. A page with several arbitrarily positioned document objects can be automatically rearranged so that the contents of the document objects are each aligned to one another.

The following relate to various methods for saliency detection: U.S. Pub. No. 2008/0304740, published Dec. 11, 2008, entitled Salient Object Detection, by Jian Sun, et al.; U.S. Pub. No. 2008/0304708, published Dec. 11, 2008, entitled DEVICE AND METHOD FOR CREATING A SALIENCY MAP OF AN IMAGE, by Olivier Le Meur, et al.; U.S. Pub. No. 2008/0304742, published Dec. 11, 2008, entitled COMBINING MULTIPLE CUES IN A VISUAL OBJECT DETECTOR, by Jonathan H. Connell; U.S. Pub. No. 2006/0093184, published May 4, 2006, entitled IMAGE PROCESSING APPARATUS, by Motofumi Fukui, et al.; and U.S. Pat. No. 7,400,761, issued Jul. 15, 2008, entitled CONTRAST-BASED IMAGE ATTENTION ANALYSIS FRAMEWORK, by Ma, et al.

U.S. Pub. No. 2007/0005356, entitled GENERIC VISUAL CATEGORIZATION METHOD AND SYSTEM; U.S. Pub. No. 2007/0258648, entitled GENERIC VISUAL CLASSIFICATION WITH GRADIENT COMPONENTS-BASED DIMENSIONALITY ENHANCEMENT; and U.S. Pub. No. 2008/0069456 entitled BAGS OF VISUAL CONTEXT-DEPENDENT WORDS FOR GENERIC VISUAL CATEGORIZATION, all by Florent Perronnin; and G. Csurka, C. Dance, L. Fan, J. Willamowski and C. Bray, "Visual Categorization with Bags of Keypoints", ECCV Workshop on Statistical Learning in Computer Vision, 2004, disclose systems and methods for categorizing images based on content.

BRIEF DESCRIPTION

In accordance with one aspect of the exemplary embodiment, a method for alignment of objects in a document includes, for an input electronic document, identifying at least first and second objects to be aligned on a page of the document. A one dimensional guideline profile is generated for one or both of the first and second objects based on a detection of saliency for the respective object(s). The first and second objects are aligned based on the guideline profile(s) to form a modified document and the modified document is output.

In accordance with another aspect of the exemplary embodiment, an apparatus for alignment of objects in a document includes computer readable memory which stores an object alignment system including an object detector for identifying first and second objects to be aligned within a document, a profile generator for generating a one dimensional guideline profile for at least the first object based on a detection of saliency for the first object, and an alignment generator for generating an alignment of the first and second objects based on the guideline profile. A processor in communication with the memory implements the object alignment system.

In accordance with another aspect of the exemplary embodiment, a computer implemented method for alignment of objects in a document includes identifying objects to be aligned on a page of an electronic document, assigning an object class to each of the objects selected from a plurality of object classes including a pictorial object class and a text object class, for each object to be aligned, selecting a respective saliency detection method based on the assigned object class, applying the selected detection method for each object to be aligned to generate a saliency representation, generating a one dimensional guideline profile for each object to be aligned based on the saliency representation, aligning at least first and second of the objects based on the respective guideline profiles to form a modified document, including translating one of the first and second objects relative to the other of the first and second objects; and outputting the modified document.

BRIEF DESCRIPTION OF THE DRAWINGS

FIG. 5 illustrates an exemplary pictorial object;

FIG. 6 illustrates generation of a saliency representation in the form of a saliency map for the pictorial object of FIG. 5, when classified as a Non-Person pictorial image, in accordance with one aspect of the exemplary embodiment;

FIG. 7 illustrates generation of a guideline profile for the pictorial object of FIG. 5, generated from the saliency map of FIG. 6;

FIG. 8 illustrates generation of a guideline profile for a pictorial object classed as Person;

DETAILED DESCRIPTION

Figure 1:
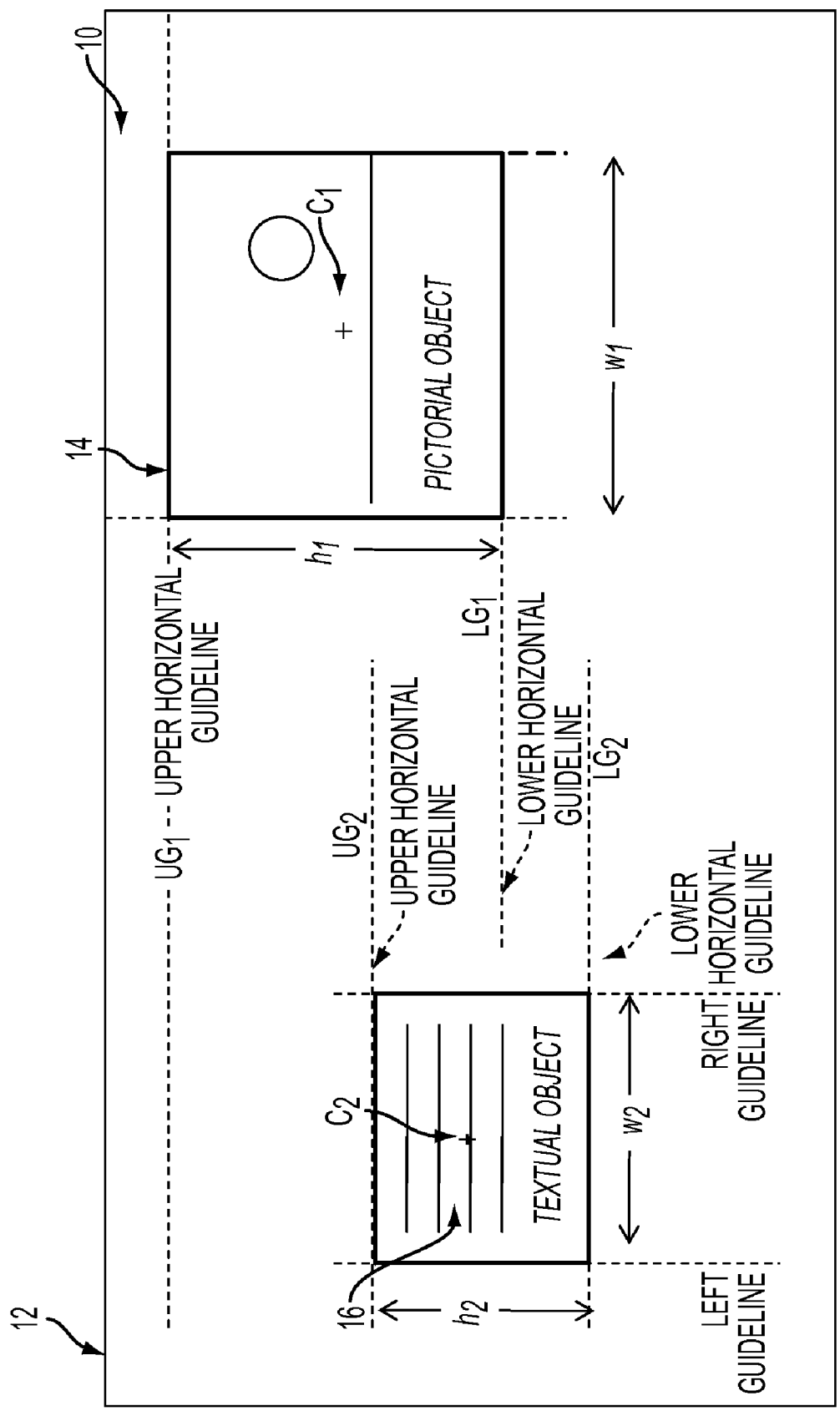
FIG. 1 is a schematic view of a document containing a pictorial object and a text object for which an alignment is sought.

The exemplary embodiment relates to an apparatus, method, and computer program product for aligning objects in a document. The exemplary alignment method is generic in the sense that it can be used on a multiplicity of document objects characterized by different content, visual aspect, and the like.

The method employs a measure of saliency in determining an appropriate alignment between two objects, such as a pictorial object and a text object. Saliency detection is seen as a simulation or modeling of the human visual attention mechanism. It is understood that some parts of an image receive more attention from human observers than others. Saliency refers to the "importance" or "attractiveness" of the visual information in an image. The aim of most saliency detection methods is to assign a high saliency to a region or regions of an image that is/are likely to be a main focus of a typical viewer's attention. Many of these methods are based on biological vision models, which aim to estimate which parts of images attract visual attention. Implementation of these methods in computer systems generally fall into one of two main categories: those that give a number of relevant punctual positions, known as interest (or key-point) detectors, such as corner (Harris) or blob (Laplace) detectors and face detectors, and those that give a more continuous map of relevance, such as saliency maps. However, there are also hybrid approaches which aim to provide a combination of the key-point and continuous methods. The exemplary embodiment is not limited to any particular type of saliency detection method. In one embodiment, the detection method is selected based on an evaluation of the type of object (text or pictorial) and/or its content. For example, a saliency map can be a probability map that takes into account the content of the object. In embodiments described herein, two (or more) types of saliency detection may be employed, and the results combined.

Exemplary saliency detection methods which may be used herein include those described in the following references: Above-mentioned U.S. patent application Ser. Nos. 12/400, 277, 12/250,248, and 12/033,434; U.S. Pub. Nos. 2008/ 0304740, 2008/0304708, 2008/0304742, 2006/0093184, U.S. Pat. No. 7,400,761; and in L. Itti, C. Koch, E. Niebur, et al., "A Model of Saliency-Based Visual Attention for Rapid Scene Analysis," IEEE Transactions on Pattern Analysis and Machine Intelligence, 20(11):1254-1259 (1998); Xiaodi Hou and Liqing Zhang, "Saliency Detection: A Spectral. Residual Approach," IEEE Conf on Computer Vision & Pattern Recognition (2007); D. Gao and N. Vasconcelos, "Bottom-up saliency is a discriminant process", Proceedings of IEEE Int'l Conf. on Computer Vision (ICCV), Rio de Janeiro, Brazil (2007); D. Gao, V. Mahadevan and N. Vasconcelos, "The discriminant center-surround hypothesis for bottom-up saliency," Proc. of Neural Information Processing Systems (NIPS), Vancouver, Canada (2007); Jones, M. J., Rehg, J. M., "Statistical Color Models with Application to Skin Detection," IJCV(46), No. 1, pp. 81-96 (January 2002); L. Itti and C. Koch, "Computational Modeling of Visual Attention," Nature Reviews Neuroscience, 2(3): 194-203 (2001), hereinafter "Itti and Koch"; Chen-Hsiu Huang, Chih-Hao Shen, Chun-Hsiang Huang and Ja-Ling Wu, "A MPEG-7 Based Content-aware Album System for Consumer Photographs," Bulletin of the College of Engineering, NTU, No. 90, pp. 3-24 (February 2004); T. Liu, J. Sun, N. Zheng, X. Tang and H. Shum, "Learning to Detect A Salient Object," CVPR (2007); and Z. Wang, B. Li, "A Two-Stage Approach to Saliency Detection in Images," In *ICASSP* 2008 *IEEE Intl. Conf. on Acoustics, Speech, and Signal Processing (ICASSP)* (March/ April 2008).

With reference to FIG. 1, an exemplary page of an electronic document 10 is graphically illustrated. The document includes a template 12, which determines the relationship of height to width of a digital document (or a page of the document), which is to be output, e.g., by printing or displaying on a screen. The digital document 10 may comprise one or more pages or may comprise a video (sequence of images) in which a text object is to be inserted into each of a sequence of the images. One or more objects 14, 16 are to be arranged on the document template 12, which when printed, form the same page of the document. The objects 14, 16, etc. each have a defined boundary (bounding box) with defined height and width ($h_1$, $w_1$, and $h_2$, $w_2$, respectively). For each object, upper and lower guidelines ($UG_1$, $LG_1$, $UG_2$, $LG_2$) define the locations of top and bottom edges of the object respectively. The guidelines $UG_1$, $LG_1$ are spaced by distance $h_1$, in the case of object 14, and guidelines $UG_2$, $LG_2$ by $h_2$, in the case of object 16. Alternatively or additionally, left and right guidelines define left and right edges of the object, and are spaced by distances $w_1$ and $w_2$, respectively.

One or more of the objects may be labeled as a fixed object, such as pictorial object 14. By "fixed", it is meant that the object is not free to move, horizontally or vertically on the template 12. One or more of the objects, such as text object 16, is labeled as a floating object, by which it is meant that the object is translatable on the template 12, in at least one dimension, here the vertical dimension (i.e., in a direction aligned a side edge of the template which defines the height of the template). However, it is also contemplated that an object may be free to move in more than one dimension, such as mutually perpendicular dimensions, or in a direction which is intermediate horizontal and vertical.

The exemplary method provides an alignment of two or more of the objects, such as the objects 14, 16 in the document template 12 which takes into account saliency of one or both of the objects 14, 16. The alignment is achieved by translation of a floating object. In the case of a vertical alignment, for example, after alignment, one or both of the upper and lower guidelines of the object having the smaller height (object 16 in this example) lie between the upper and lower guideless of the object 14 having the larger height. However, the exact position between upper and lower guidelines $UG_1$ and $UG_2$ is a function of the detected saliency of one or both objects.

The objects 14, 16 for the document may be already positioned on the template as part of a workflow process, but without any consideration as to their spatial arrangement. For example, the top of the first object 14 may be automatically aligned with a top of the second object 16.

Exemplary object 14 is a pictorial object. A pictorial object can be a photographic image, which depicts something in the real world. A graphical element can be a graph, chart, line drawing, or the like, and in some embodiments, may be treated like a pictorial object. Both of these types of objects generally have visual features which can be detected through saliency detection methods. As will be appreciated, while the pictorial objects exemplified in the accompanying drawings (FIGS. 5, 8, and 9) are shown as line drawings, these are intended to represent photographic images (e.g., color photographic images), for which the representative data shown in the FIGURES may be obtained. Object 16 is a text object, which predominantly comprises a text sequence in a natural language which has been generated using characters from a predefined character set and one or more selected fonts. Although text objects may have some salient features, such as enlarged text portions or unusual text, such as equations, in some embodiments, each "on" pixel can be considered as being equal in saliency.

The objects 14, 16 may be in any suitable format, such as PDF, JPEG, PDF, GIF, JBIG, BMP, TIFF, or other common file format used for images and which may optionally be converted to another suitable format prior to processing. While the exemplary document shown in FIG. 1 has a text object 16 and one pictorial object 14, it is to be appreciated that the method is applicable to documents with various numbers of each type of object. Each object may comprise an array of pixels, each pixel being associated with a colorant value, or in the case of a multi-color image, with several colorant vales, one for each color separation. The term "pixel" as used herein is intended to denote "picture element" and encompasses image elements of two-dimensional images or of three-dimensional images (which are sometimes also called voxels to emphasize the volumetric nature of the pixels for three-dimensional images). The height h and width w of the objects may be expressed as a number of pixels of the template, as may their x,y coordinates, relative to side and top edges of the template.

Figure 2:
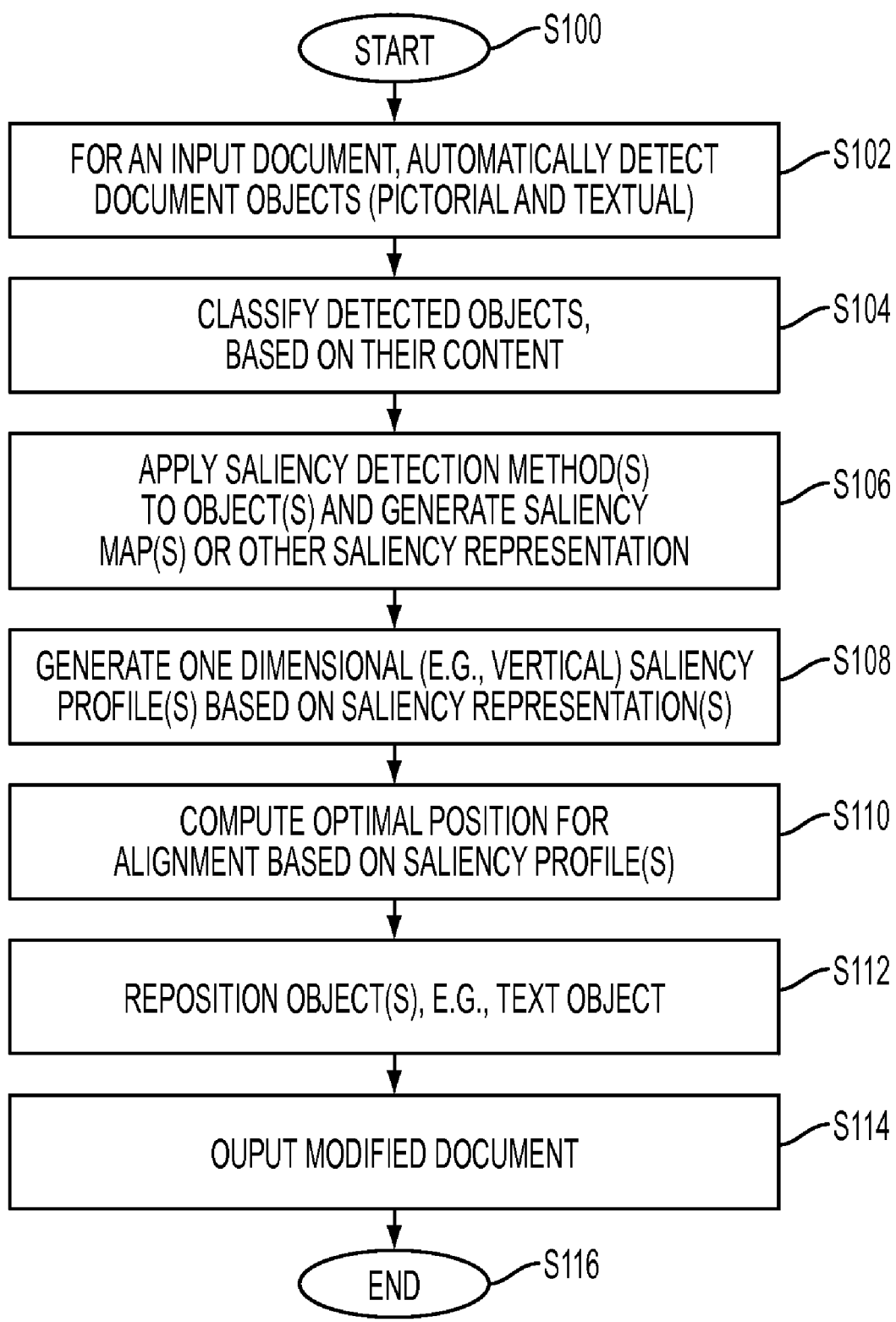
FIG. 2 is a flow diagram which illustrates a method of alignment of objects in a document, in accordance with one aspect of the exemplary embodiment.

FIG. 2 illustrates an exemplary method for aligning objects in documents. The method begins at S100 with the input of a digital document containing document objects, such as objects 14, 16.

At S102, document objects (pictorial and textual) are automatically detected. Fixed and floating objects are separately identified.

At S104, the detected objects are classified based on their content. In particular, the object is classified according to object type (pictorial, text, etc.) and may be further categorized within these types.

At S106, depending on the types/categories of object detected, a saliency representation of each object is generated, such as a saliency map or other representation. Various detectors may be used, for example, based on a type/category of the object.

At S108, at least one function (guideline profile) indicating a one dimensional (e.g. vertical) saliency of the respective object, is generated based on the output(s) of the saliency detectors.

At S110, a translation of at least a first of the objects relative to a second of the objects is computed based on the guideline profile(s), e.g., by minimizing a cost function determined from the guideline profiles or by bringing maxima of the guideline profiles into alignment.

At S112, a realignment of the objects is performed, by adjusting the relative positions of the objects, based on the function. For example, the text object 16 is re-positioned to an optimal position relative to the fixed pictorial object 14.

At S114, the modified document is output.

The method ends at S116.

Figure 3:
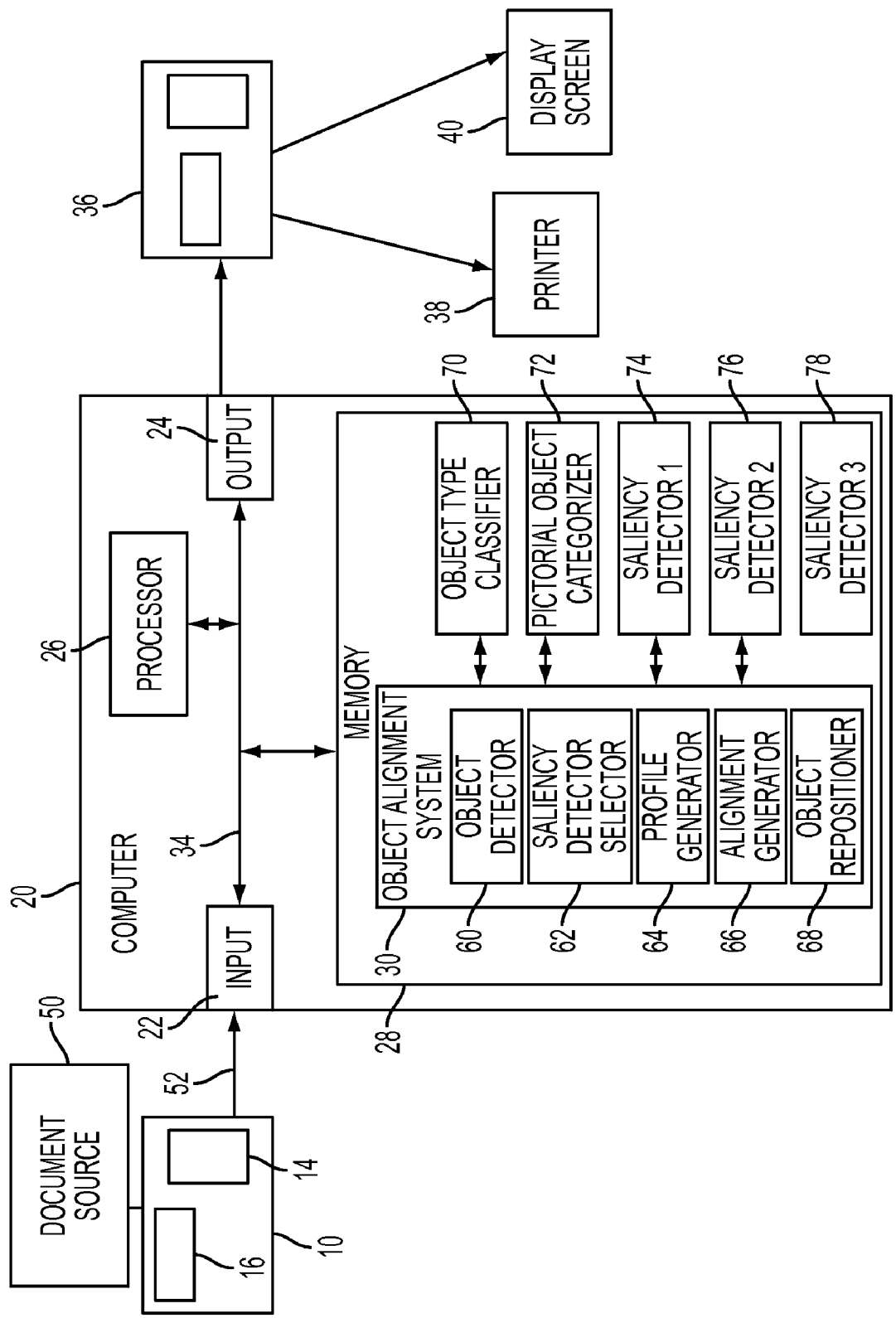
FIG. 3 is a functional block diagram of an exemplary apparatus for alignment of objects in a document, in accordance with another aspect of the exemplary embodiment.

FIG. 3 illustrates an exemplary apparatus for alignment of objects 14, 16 in a document, which may be used in performing the exemplary method described above. The apparatus may be embodied in an electronic processing device, such as the illustrated computer 20. In other embodiments, the electronic processing device 20 may include one or more specific or general purpose computing devices, such as a network server, Internet-based server, desk top computer, laptop computer, personal data assistant (PDA), cellular telephone, or the like. The apparatus 20 includes an input component 22, an output component 24, a processor 26, such as a CPU, and memory 28. The computer 20 is configured to implement an object alignment system 30, hosted by the computer 20, for aligning objects, such as pictorial and text objects, in an original input document. The object alignment system 30 may be in the form or software, hardware, or a combination thereof. The exemplary object alignment system 30 is stored in computer readable memory 28 (e.g., in a non-volatile portion of computer memory 28) and comprises instructions for performing the exemplary method described above with reference to FIG. 2. These instructions are executed by the processor 26. Components 22, 24, 26, 28 of the computer 20 may be connected for communication with each other by a data/control bus 34. Input and output components may be combined or separate components and may include, for example, data input ports, modems, network connections, and the like.

The computer 20 is configured for receiving a digital document to be processed, such as document 10, e.g., via input component 22, and storing the document 10 in memory, such as a volatile portion of computer memory 28, while being processed by the object alignment system 30. The document 10 is transformed by the object alignment system 30, e.g., by rearrangement of the objects within it. The computer 20 is also configured for storing and/or outputting a modified document 36 generated from the input document 10 by the object alignment system 30. The modified document 36 may be output to another component of a workflow processing system (not shown) which performs further operations on the modified document 36, and/or to an image output device 38, 40. For example, the computer 20 may include or be in data communication with a printer 38, for rendering the document 36 on print media, such as paper, with colorants, such as inks or toners and/or a display 40, such as an LCD screen, for displaying the modified document on a screen.

The document 10 can be input from any suitable source 50, such as another component of a workflow process, which may be resident in the computer 20, or an external source, such as a workstation, database, scanner, or memory storage device, such as a disk, memory stick, or the like. In the case of an external source 50, it may be temporarily or permanently communicatively linked to the computer 20 via a wired or wireless link 52, such as a cable, telephone line, local area network or wide area network, such as the Internet, through a suitable input/output (I/O) connection 22, such as a modem, USB port, or the like.

In the case of a computer 20, processor 26 may be the computer's central processing unit (CPU). However, it is to be appreciated that the exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any processor, capable of implementing a finite state machine that is in turn capable of implementing the flowchart shown in FIG. 2, can be used to implement the method for alignment of objects.

Memory 28 may be in the form of separate memories or combined and may be in the form of any type of tangible computer readable medium such as random access memory (RAM), read only memory (ROM), magnetic disk or tape, optical disk, flash memory, holographic memory, or suitable combination thereof.

As shown in FIG. 3, the object alignment system 30 includes various processing components 60, 62, 64, 66, 68 for performing the exemplary method.

In particular, an object detector 60 detects document objects and whether or not they are fixed or floating, with respect to a particular dimension. A saliency detector selector 62 identifies an appropriate saliency detection method. Selector 62 communicates with an object type classifier 70 and an image type classifier 72. Classifier 70 assigns an object type to each object. Classifier 72 assigns a pictorial image category to objects classed as pictorial images. Both classifiers 70, 72 may be trained with training sets of objects containing positive and optionally negative examples of the different types and categories of objects. The saliency detector selector 62 selects the appropriate saliency detection method for each object based on the output of classifiers 70, 72. For example, FIG. 3 shows three saliency detectors 74, 76, 78 by way of example. Selector calls the appropriate one of the saliency detectors for each image which generates a saliency representation for the object in question. A profile generator 64 takes the saliency representation and generates a guideline profile indicating a one dimensional (e.g. vertical) saliency of the respective object based thereon. An alignment generator 66 computes a translation for one or both objects to bring them into an optimal alignment, based on the guideline profiles.

An object repositioner performs the realignment of the objects, e.g., by storing new coordinates for one or both objects and outputs the modified document. The new coordinates may be stored as tags, such as HTML tags, or in a file which accompanies the document.

Further details of the apparatus and method now follow.
Document Object Detection: (S102)

At S102, all objects composing the document are identified and located in the page. For detection of objects within the document, direct and indirect methods exist. If the document is in an open format, such as XSL-FO (Extensible Stylesheet Language Formatting Objects, which is a language for formatting XML data) this step can be carried out directly. Apache FOP, for example, is an open source print formatter driven by XSL formatting objects (XSL-FO) and an output independent formatter. The application reads a formatting object (FO) tree and renders the resulting pages in a specified output format, such as PDF, PS, PCL, AFP, XML, or the like. See, also, Xiaofan Lin, Active Document Layout Synthesis, 8th International Conference on Document Analysis and Recognition, Seoul, Korea (2005); Itti and Koch, "A saliency-based search mechanism for overt and covert shifts of visual attention." Vision Research, v. 40. 1489-1506 (2000).

For other documents, indirect methods can be used. Examples of indirect methods are described in K. Y. Wong, R. G. Casey, F. M. Wahl, "Document analysis system," IBM Journal of Research and Development (1982); and George Nagy, "Twenty years of document image analysis in PAMI," IEEE Transactions on Pattern Analysis and Machine Intelligence, Vol. 22, No. 1, (January 2000). For example, a document may be binarized into black and white pixels and various features used to characterize each block of black pixels.

For each detected object 14, 16, the location of the centre of mass $c_1$, $c_2$ and the maximum height and width ($h_1$, $w_1$, and $h_2$, $w_2$, respectively), are determined (FIG. 1).
Document Classification: (S104)

Each of the objects 14, 16 may be classified into one of a plurality of classes. In the exemplary embodiment, three main classes are used: text islands, pictorial images (e.g., photographic), and graphic elements. For pictorial images and graphical images, an additional classification step is carried out.

In evaluating the type of the object, a classifier 70 may be used to assign each object into one of a set of object classes. Alternatively, the object is assigned to a class based on tags associated with the object or document. In this case, S104 comprises reading the tags to identify the class to which the object is to be assigned. While in the exemplary embodiment, three classes are employed: textual, graphical, and pictorial objects, other classes may be used.

For graphical images, the image can be classified using an automatic method such as a Generic Visual Categorizer (GVC). This step can be useful to understand the content of the image and use it as a priori information to tune the next steps better.

For the objects classed as pictorial images, a further investigation may be performed to evaluate the content of the image. For this step, a categorizer 72, or set of categorizers, may be trained to assign one of a set of content-based classes to the pictorial image. The categorizer may be pre-trained with images which have been manually labeled according to class. For example, a generic visual classifier (GVC) can be used to classify the images in different categories such as two or more of people, images with no-faces, buildings, sky, seascapes, landscapes, and the like. Exemplary classifiers are disclosed, for example, in above-mentioned U.S. Pub. Nos. 2007/0005356, 2007/0258648, and 2008/0069456, the disclosures of which are incorporated herein in their entireties by reference. For example, a simplified system may employ three categories, such as sky, people, and no-people (or simply a people/no people classifier).

Each object can thus be tagged with a label representing it object class (graphical, pictorial, or text) and, in the case of a pictorial object, a label representing its content-based category (sky, people, or no-people).

Saliency Detection: (S106)

Figure 4:
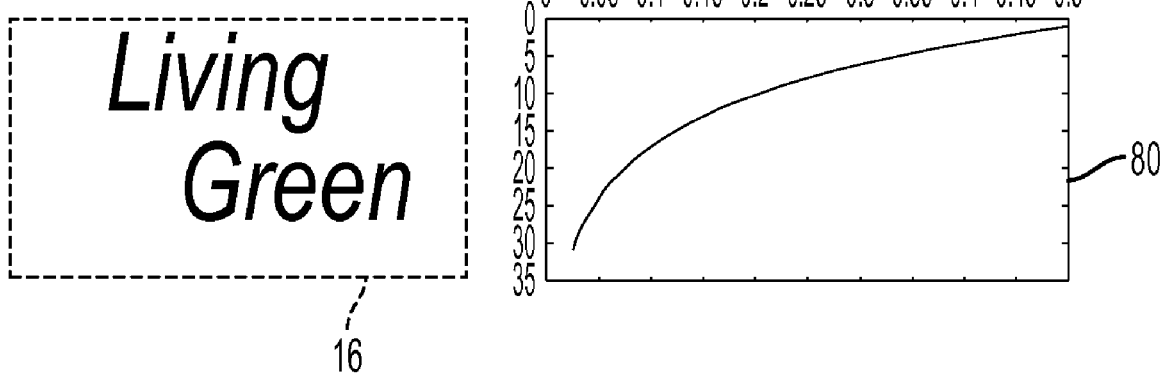
FIG. 4 illustrates generating a saliency representation for a textual object.

For each detected object, a distribution (guideline profile) is determined. The guideline profile indicates good vertical position(s) for an alignment guideline. Three different methods for determining distributions are contemplated, accordingly to the label of the object:

For Textual Objects, the detector 74 generates a simple Chi-Squared distribution parameterized accordingly to the dimensions of the object. For example, as shown in FIG. 4, the distribution 80 can be used as the guideline profile from text object 14. This can be used to approximate the guideline profile for text. Or, the geometric center of the text box can be used.

For Image Objects, classed as No-People: (i.e., for generic images which do not contain faces, a conventional saliency map may be employed (see, for example Itti and Koch, "A saliency-based search mechanism for overt and covert shifts of visual attention." Vision Research, v. 40. 1489-1506 (2000). For example, FIG. 5 shows an exemplary object 14, in this case, a pictorial image which has been categorized as no-people. FIG. 6 shows a saliency representation of the image forming object 14 in terms of a saliency map 82. The image is divided into small regions. In FIG. 6, for example, a grid is shown which is made up of 32×22 rectangular regions. Each region is assigned a saliency value, which in the illustrated FIGURE, is represented on a graduated scale (e.g., a set of gray scale values) where white indicates high saliency and black, low saliency. The detector 74 used has placed high saliency values on the regions falling in the bright regularly shaped regions on either side of the statue. A guideline profile 84 is generated by averaging each row over the horizontal axis to retrieve the vertical guideline profile, as illustrated in FIG. 7. This type of saliency detection method may also be used for graphical elements and pictorial images not assigned to a "people" class. Alternatively, a specifically tailored saliency detector may be used.

For Image Objects that are labeled with the People category, a face detector 78 may be used, such as a Viola-Jones face detector (see, P. Viola and M. Jones. "Robust real-time face detection." International Journal of Computer Vision (IJCV) 57(2) 137-154 (2004)). This method assumes that the face is the most salient region of the image. FIG. 8, for example, illustrates a people categorized object 14 in which a face has been detected (within circle 86). A position of the eyes can be retrieved using a simple calculation on the face size (shown by line 88). Alternatively, more complex approaches aimed at directly detecting the position of the eyes can be employed (See, for example, G.C. Feng, P.C. Yuen, "Multi-cues eye detection on gray intensity image," Pattern Recognition, Elsevier (2001)). Once the vertical position of the eyes is detected, a Gaussian distribution 90 can be centered on the estimated vertical height of the eyes and parameterized in relation to the face size. The Gaussian distribution can be used as the guideline profile.

In other embodiments, a hybrid approach may be employed. For example, two saliency maps are generated, one based on face detection and the other using a conventional saliency map and the results combined to obtain a combined saliency map which is used to generate the profile.

In yet another embodiment, saliency can be detected for all types of pictorial image using the method described in above-mentioned application Ser. No. 12/400,277. In this approach, the object is compared with objects (images) in a large set of stored objects to retrieve a set of the most similar stored objects. Each stored object has a region of interest manually labeled. Using the regions of interest of the retrieved set of objects as positive (salient) examples, a classifier is trained to classify regions in the object 14 as salient or non salient, resulting in a saliency map which is content driven.

Guideline Profile Evaluation: (S108)

Figure 9:
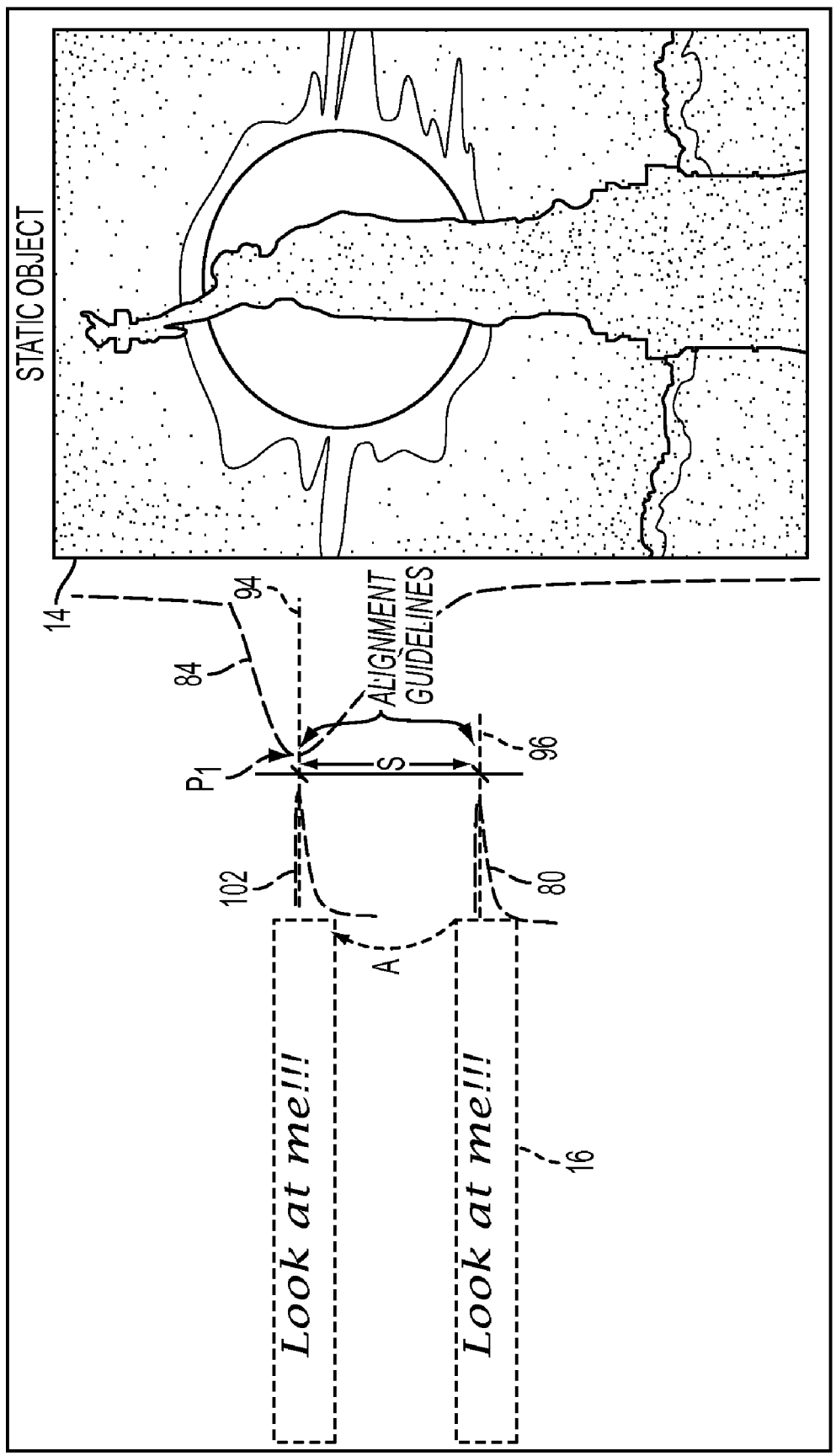
FIG. 9 illustrates aligning objects based on their guideline profiles.

As discussed above, for each object 14, 16, vertical and horizontal alignment profiles 80, 84, 90 (guideline profiles) are estimated to facilitate the alignment between two document objects. These profiles consist of distributions indicating the likelihood that an alignment guideline 94, 96 (FIG. 9) should be placed in a specific vertical position to reflect aesthetic and/or perceptual criteria. In FIG. 9, the alignment guidelines are placed at the distribution maxima. The profile can be smoothed or otherwise processed to ease computation. For example, where there is more than one peak in the distribution, as shown in FIG. 7 (peaks $P_1$ and $P_2$), the smaller peak(s) may be omitted from the guideline profile 84 (FIG. 9).

Figure 10:
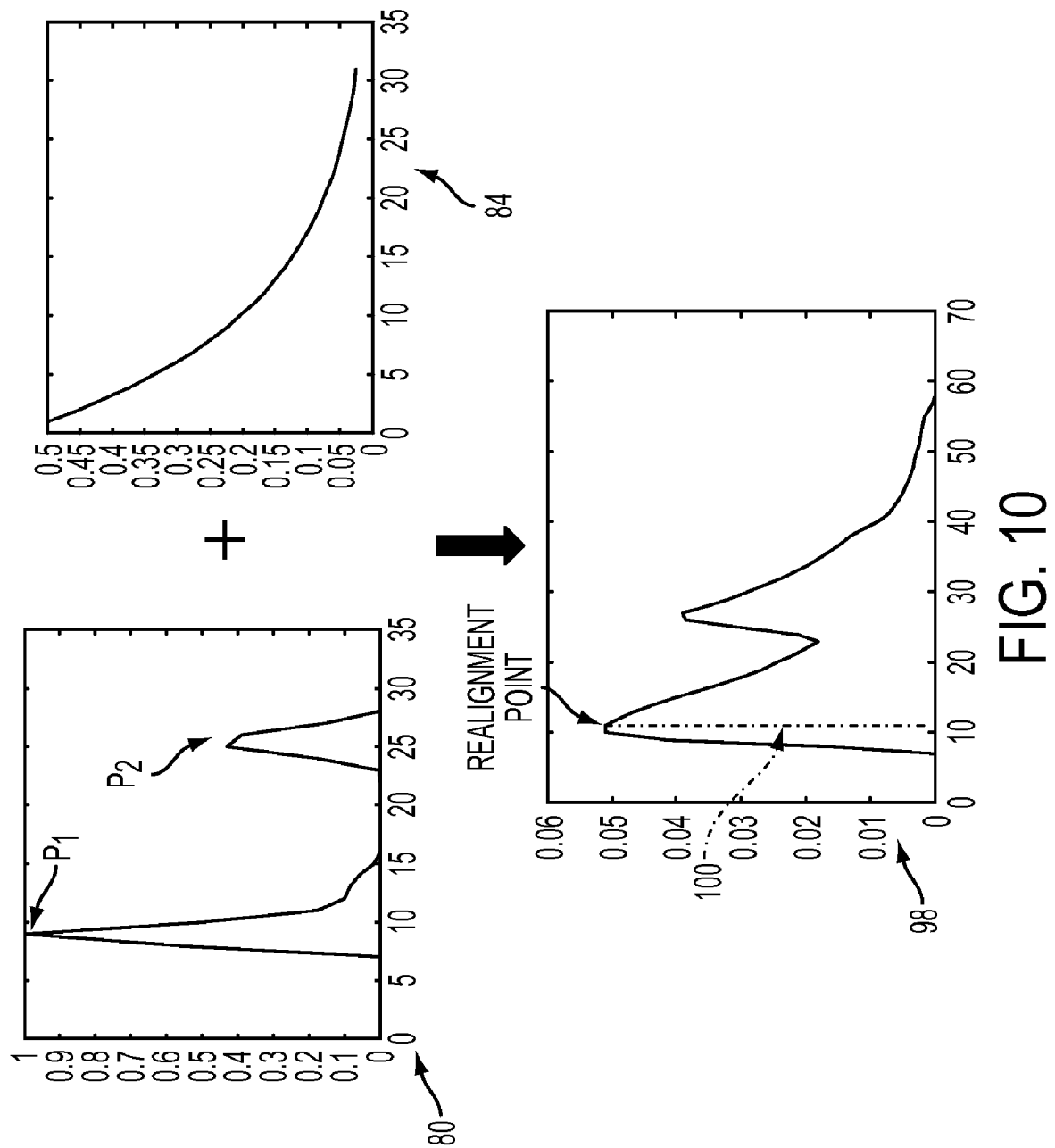
FIG. 10 illustrates convolution of two guidelines profiles (pictorial object and text object)

Alternatively, a convolution 98 (multiplication) of the two guideline profiles (here guidelines 80 and 84) can be computed as illustrated in FIG. 10, and then the maximum can be evaluated to define the realignment point 100. Here, the maximum of the largest peak is taken as the alignment guideline. Note that in FIG. 10, the guideline profiles and convolution are arranged horizontally rather than vertically.

Object Re-Alignment: S110, S112

Based on the guidelines profiles, the objects are re-aligned, e.g., by minimizing a cost function.

Object realignment may be carried out by shifting one or both objects relative to the other. If the position of one object is fixed, such as the pictorial object 14 in FIG. 9, and the other 16 is free to move (floating), then the floating object is shifted vertically so that its alignment guideline coincides with the alignment guideline of the other object. This can be performed very simply by computing the vertical difference s between the two maxima of the two guideline profiles (i.e., the distance between the two alignment guidelines 94 and 96). Then floating object 16 is moved vertically by a distance s in the direction of arrow A such that the alignment guidelines 94 and 96 are horizontally aligned (colinear). The new position of the object 16 in the document page 10 is stored. Alternatively, as noted above, the convolution 100 of the two guidelines can be computed and its maximum used as the realignment point.

While the exemplary embodiment has been described with particular reference to the alignment of a pictorial object with a text object, it is to be appreciated that the method is also applicable to alignment of a first object with a second object, the first and second objects being independently selected from the group consisting of a text object, a pictorial object, a graphical object, a textual object, and objects which are combinations thereof. Further, it is contemplated that a first object may be vertically aligned with a second object and also horizontally aligned with a third object. Further, it is contemplated that a first object may be vertically or horizontally aligned with two or more other objects, for example, by aligning a second object with a first peak of an alignment profile of the first object and aligning a third object with a second peak of the first object's alignment profile. In yet another embodiment, the system may generate a horizontal and a vertical alignment profile for first and second objects and propose either a horizontal or vertical alignment of the two objects based on which fits best on the page. While the borders of the exemplary objects 14, 16 are spaced apart from each other, in other embodiments it is contemplated that a floating first object may be wholly or partly overlapping a second object, e.g., contained within it.

The method illustrated in FIG. 2 may be implemented in a computer program product that may be executed on a computer. The computer program product may be a tangible computer-readable recording medium on which a control program is recorded, such as a disk, hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use. Or the program may be in the form of a transmittable carrier wave in which the control program is embodied as a data signal transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for aligning document objects.

Applications

The exemplary system and method find application in variable data applications such as one-to-one personalization and direct mail marketing. Variable document creation poses various challenges to the assurance of a proper aesthetical level due the portion of dynamic content typically included. One challenge is how to treat visual aspects dynamically within the variable data workflow, so that enhancement or management operations are handled in a more context sensitive fashion. The exemplary method helps to address this in the alignment of document objects based on semantic content.

Other applications, such as image and document asset management and document image/photograph set visualization, and the like can also profit from the alignment of objects (e.g., photofinishing).

Without intending to limit the scope of the exemplary embodiment, the following examples demonstrate the application of the exemplary method.

EXAMPLE

Figure 11:
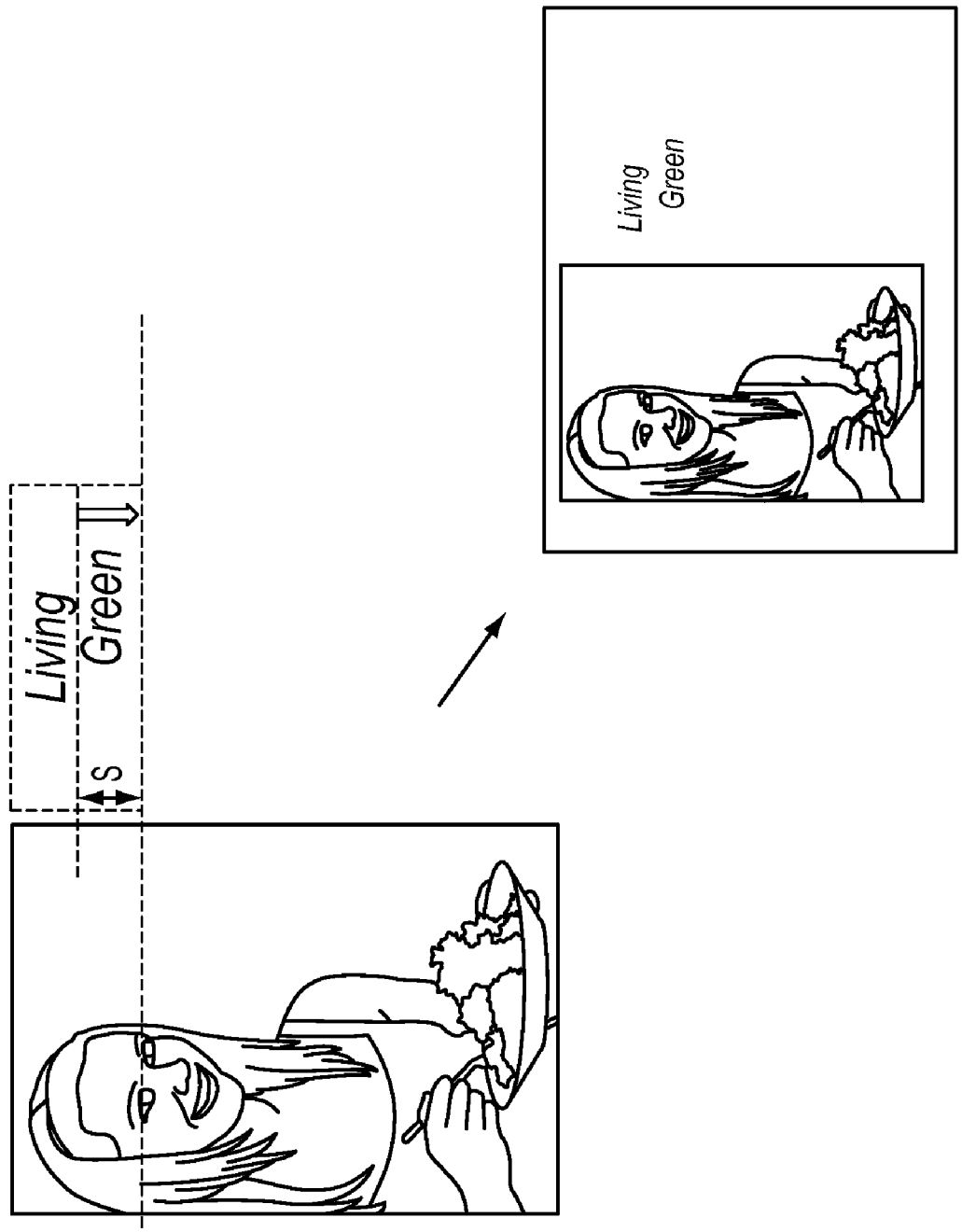
FIG. 11 illustrates re-alignment of a text object with a pictorial object classed as person.

An automated prototype system, developed as described above, was used to compute an appropriate position for a floating text island 16 for the object 14 shown in FIG. 8. The system correctly positioned the text island vertically at about eye level of the person, as exemplified approximately in FIG. 11. This is more aesthetically pleasing than a conventional system which may align the tops or bottoms of the objects.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for alignment of objects in a document comprising:
    for an input electronic document, identifying first and second objects to be aligned on a page of the document;
    detecting saliency for the first object, including generating a saliency map of the first object;
    generating a first one-dimensional guideline profile for the first object based on the detection of saliency for the first object, the guideline profile being based on one one-dimensional averaging of saliency values in the saliency map;
    generating a second one-dimensional guideline profile for the second object based on a detection of saliency for the second object;
    aligning the first and second objects based on the first and second guideline profiles to form a modified document; and
    outputting the modified document.

2. The method of claim 1, further comprising assigning at least the first object to one of a plurality of object classes, each class being associated with a saliency detection method, the plurality of classes including a first class which is associated with a first saliency detection method and a second class, which is associated with a second detection method.

3. The method of claim 2, wherein the assigning of at least the first object to an object class comprises assigning the first and second objects to a respective object class.

4. The method of claim 2, wherein the assignment includes using a classifier trained to classify objects according to class.

5. The method of claim 2, wherein the plurality of classes comprise at least one of:
    a pictorial object class;
    a text object class; and
    a graphical element class.

6. The method of claim 5, wherein when one of the first and second objects is assigned to a pictorial object class, the pictorial object is categorized into one of at least three categories, a first of the categories being a People category, and a second of the categories being a Non-People category, and a third of the categories being a Sky category.

7. The method of claim 5, wherein when one of the first and second objects is assigned to a pictorial object class, the pictorial object is categorized into one of at least two categories, a first of the categories being a People category, and a second of the categories being a Non-People category, wherein when the pictorial object is categorized into the People category, the detection method includes detecting a location of at least one of a person's face and a person's eyes, the guideline profile having a peak value at a location corresponding to the person's face or person's eyes.

8. The method of claim 7, wherein when the pictorial object is categorized into the Non-People category, the detection method includes generating a saliency map.

9. The method of claim 2, wherein first class is a pictorial object class and the second class is a text object class.

10. The method of claim 1, wherein the aligning includes convoluting the first and second guideline profiles to identify a peak and aligning the objects based on a location of the peak.

11. The method of claim 10, wherein the aligning includes aligning a peak of the first guideline profile with a peak of the second guideline profile.

12. The method of claim 1, wherein one of the first and second objects is a fixed object and the other of the first and second objects is a floating object and the alignment includes moving the floating object.

13. The method of claim 1, wherein the first object comprises a pictorial object and the second object comprises a text object.

14. A non-transitory computer program product encoding instructions which, when executed by a computer causes the computer to execute the method of claim 1.

15. A computer apparatus comprising:
memory which stores instructions for performing the method of claim 1; and
a processor in communication with the memory for executing the instructions.

16. A method for alignment of objects in a document comprising:
for an input electronic document, identifying first and second objects to be aligned on a page of the document;
generating a first one-dimensional guideline profile for the first object based on a detection of saliency for the first object, wherein the first object has horizontal and vertical dimensions and the first one dimensional guideline profile has, as its one dimension, the vertical dimension or the horizontal dimension of the object;
generating a second one-dimensional guideline profile for the second object based on a detection of saliency for the second object;
aligning the first and second objects based on the first and second guideline profiles to form a modified document; and
outputting the modified document.

17. An apparatus for alignment of objects in a document comprising:
computer readable memory which stores an object alignment system comprising:
an object detector for identifying first and second objects to be aligned within a document;
a profile generator for generating a one dimensional guideline profile for at least the first object based on a detection of saliency for the first object, the detection of saliency including generating a saliency map of the first object, the guideline profile being based on one dimensional averaging of saliency values in the saliency map; and
an alignment generator for generating an alignment of the first and second objects based on the guideline profile; and
a processor in communication with the memory which implements the object alignment system.

18. The apparatus of claim 17, wherein the object alignment system further comprises a saliency detector selector which selects a saliency detection component based on a type of the first object, the profile generator generating the one dimensional guideline based on an output of the selected saliency detection component.

19. A computer implemented method for alignment of objects in a document comprising:
identifying objects to be aligned in an electronic document;
assigning an object class to each of the objects selected from a plurality of object classes, the classes including at least one pictorial object class and a text object class;
for each object to be aligned, selecting a respective saliency detection method based on the assigned object class;
applying the selected detection method for each object to be aligned to generate a saliency representation;
with a computer processor, generating a one dimensional guideline profile for each object to be aligned based on one dimensional averaging of saliency values in the saliency representation; and
aligning at least first and second of the objects based on the respective one dimensional guideline profiles to form a modified document, including translating one of the first and second objects relative to the other of the first and second objects; and
outputting the modified document.

20. The method of claim 19, wherein the generating of the one dimensional guideline profile for at least one object to be aligned is based on a combination of at least two saliency representations corresponding to different saliency detection methods.

* * * * *